United States Patent [19]

Thoma et al.

[11] Patent Number: 5,090,949

[45] Date of Patent: Feb. 25, 1992

[54] VARIABLE SPEED TRANSAXLE

[75] Inventors: Christian H. Thoma, St. Clement; George D. M. Arnold, St. Helier, both of Channel Islands

[73] Assignee: Unipat AG, Glarus, Switzerland

[21] Appl. No.: 625,129

[22] Filed: Dec. 10, 1990

[30] Foreign Application Priority Data

Dec. 11, 1989 [GB] United Kingdom ............... 8927920
Jun. 18, 1990 [GB] United Kingdom ............... 9013569

[51] Int. Cl.⁵ .............................................. F16H 47/04
[52] U.S. Cl. .................................... 475/83; 475/200
[58] Field of Search .............................. 475/83, 200

[56] References Cited

U.S. PATENT DOCUMENTS

| | | | |
|---|---|---|---|
| 2,257,792 | 10/1941 | Fletcher | 60/53 |
| 2,583,704 | 1/1952 | Nicholls et al. | 60/53 |
| 3,199,297 | 8/1965 | Croswhite | 60/53 |
| 3,360,933 | 1/1968 | Swanson et al. | 60/53 |
| 3,376,703 | 4/1968 | Buczynski | 60/53 |
| 3,430,438 | 3/1969 | Weiss | 60/53 |
| 4,103,566 | 8/1978 | von Kaler et al. | 74/701 |
| 4,583,425 | 4/1986 | Mann et al. | 475/83 |
| 4,686,829 | 8/1987 | Thoma et al. | 60/464 |
| 4,691,512 | 9/1987 | Thoma et al. | 60/456 |
| 4,756,208 | 7/1988 | Hayashi et al. | 475/83 X |
| 4,781,259 | 11/1988 | Yanaoka et al. | 180/75 |
| 4,784,013 | 11/1988 | Yamaoka et al. | 74/606 |
| 4,843,818 | 7/1989 | Thoma et al. | 60/488 |
| 4,856,368 | 8/1989 | Fujisaki et al. | 74/606 |
| 4,862,767 | 9/1989 | Hauser | 475/83 |
| 4,870,820 | 10/1989 | Nemoto | 60/487 |
| 4,893,524 | 1/1990 | Ohashi et al. | 475/83 |
| 4,903,545 | 2/1990 | Louis et al. | 475/83 X |
| 4,914,907 | 4/1990 | Okada | 60/487 |
| 4,922,787 | 5/1990 | Fujisaki et al. | 475/83 |
| 4,942,780 | 7/1990 | Fujisaki et al. | 475/83 |
| 4,979,583 | 12/1990 | Thoma et al. | 180/62 |

FOREIGN PATENT DOCUMENTS 617639 2/1949 United Kingdom .
1374411 11/1974 United Kingdom .

*Primary Examiner*—Dwight Diehl
*Attorney, Agent, or Firm*—Young & Thompson

[57] ABSTRACT

A transaxle housing is provided for a small-sized vehicle such as a grass-mowing lawn tractor and encloses an internally located hydrostatic transmission in association with speed reducing gearing and mechanical differential for reasons of compactness and simplicity of manufacture. The axle housing comprises two members connected together alone a parting plane to define a number of internal chambers, at least one chamber used to enclose the hydrostatic transmission and remaining chambers enclosing speed reducing gearing and differential. One housing element is provided with a vertical input shaft which is operatively connected through bevel gearing to a hydraulic pump, the pump mounted perpendicular and fluidly coupled to a hydraulic motor, the rotary axis of the hydraulic motor being coincident with the parting plane of the housing and parallel to the rotating axes of the half shafts of the transaxle. The bevel gearing being located within either the chamber enclosing the hydrostatic transmission or within one of the remaining chambers enclosing the reduction gearing and differential.

18 Claims, 4 Drawing Sheets

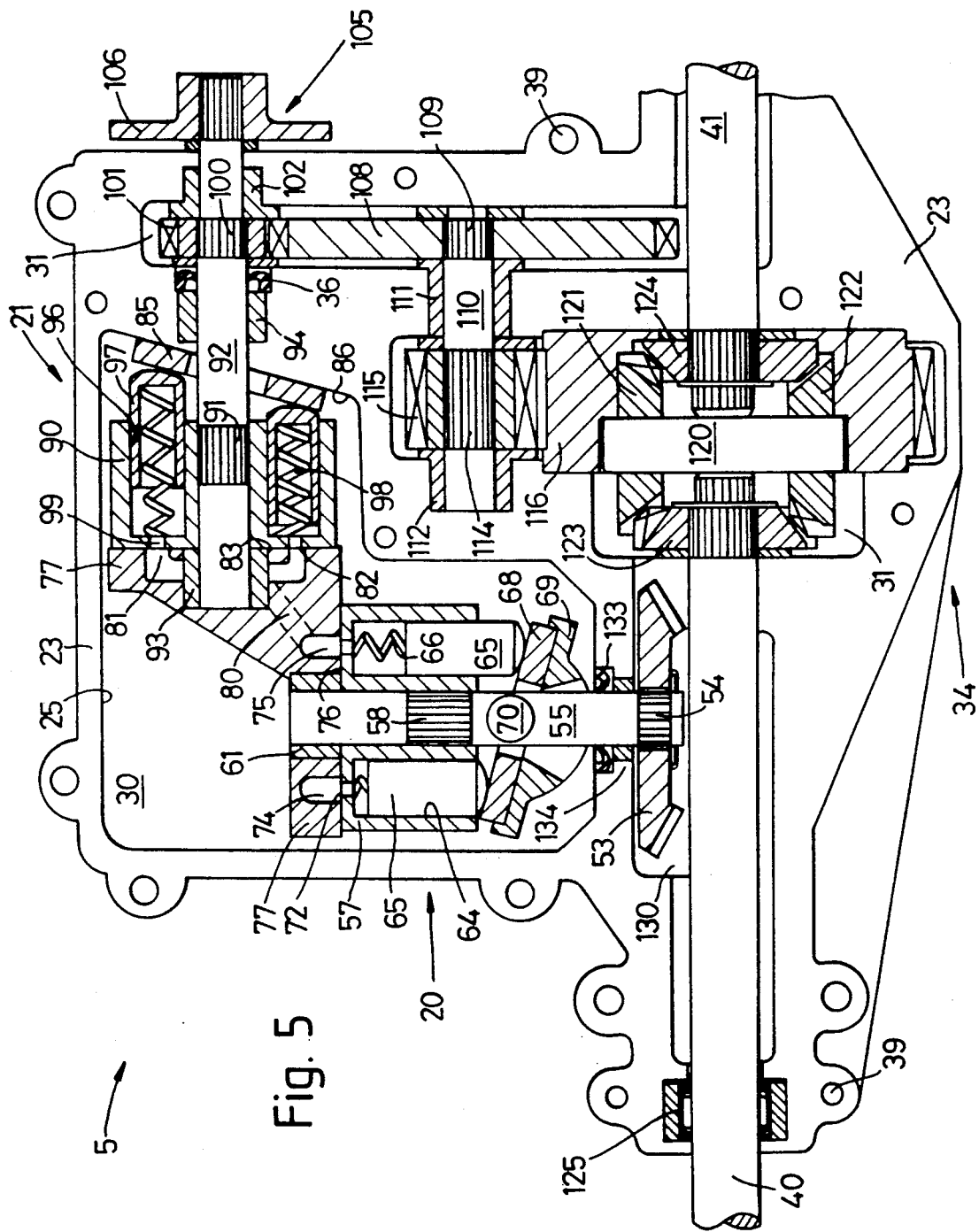

5,090,949

VARIABLE SPEED TRANSAXLE

BACKGROUND OF THE INVENTION

The field of the invention relates to hydrostatic machines in association with transaxle driving apparatus for use in light grass-mowing vehicles, such as ride-on tractors and walk-behind mowers, where in particular it becomes advantageous to manufacture the hydrostatic transmission and transaxle as one unitary item.

The present invention is directed towards providing improvements to hydrostatic variable speed transaxles of the type as shown in U.S. Pat. No. 4,979,583, entitled "Variable Speed Transaxle".

The prior patent has disclosed therein embodiments for a hydrostatic transmission disposed within a transaxle housing including vertical input drive means operatively connecting with a rotary cylinder barrel of the hydraulic pump. The hydraulic pump is fluidly coupled to a hydraulic motor, and the hydraulic motor is connected via gearing that includes bevel gearing, to the differential and axle drive shafts of the transaxle.

The large distance from the hydraulic motor to the differential has to be bridged by a number of gear trains, and by contrast, the present invention offers a method of reducing the size of the housings through the use of bevel gearing between the vertical input drive shaft and the hydraulic pump of the hydrostatic transmission. Furthermore, there is an advantage in achieving overall compaction of the transaxle by obtaining a close relative position of the input drive shaft to the differential.

What is needed is a variable speed transaxle of more compact form then hitherto, such that its envelope dimensions are either similar of preferably smaller then transaxles of the mechanical-shift type, where the overall number of internal component parts are reduced and material savings are made due to the smaller housings required.

SUMMARY OF THE INVENTION

In the present invention the hydraulic pump and the motor of the hydrostatic transmission are mounted perpendicular to each other within an axle assembly, such that the rotating axis of the hydraulic motor is parallel to the rotating axis of the axle shafts attached to the drive wheels of the vehicle.

A bevel pinion gear attached and driven by the vertically aligned input shaft of the transaxle is used in combination with a further bevel gear which drives the rotary cylinder barrel of the hydraulic pump. These bevel gears turn the drive axis through ninety degrees from the vertical to the horizontal plane.

Location of such bevel gearing at the input end of the hydrostatic transmission, in a position between the input drive shaft and the cylinder barrel of the hydraulic pump, has the further advantage in that it encounters lower torque loadings than when positioned between the hydraulic motor and drive shafts of the transaxle. Therefore this invention teaches that bevel gear means should be placed at the least torque loaded location in the transaxle, namely between the input shaft and the cylinder unit of the hydraulic pump, rather than in the more highly stress loaded area between the hydrostatic motor and differential.

The invention therefore, as here disclosed applies most beneficially to both common types of hydrostatic transmission employing either axial pistons or radial pistons disposed with a rotary cylinder barrel.

These and other objects of the invention will become more apparent in the detailed description and examples which follows.

BRIEF DESCRIPTION OF THE DRAWINGS

The above mentioned and other features and objects of the invention, and the manner of attaining them, may be performed in various ways and will now be described by way of examples with reference to the accompanying drawings, in which:

FIG. 5 is a plan view of a alternative variable speed transaxle with the upper housing element removed to show a hydrostatic transmission of the axial piston type and where the bevel gears are disposed within a separate chamber from the chamber containing the hydrostatic transmission.

DETAILED DESCRIPTION OF THE PREFERRED EMBODIMENT

Almost all manufacturers of light duty lawn tractor grass mowers have an increasing tendency to install vertical crank-shaft internal combustion engines to such vehicles, thereby enabling them to fit simple belt drives from the engine to the mower deck and transaxle.

The engine can be mounted on the chassis of the vehicle either over the front or rear wheels, whereas the transaxle is almost always mounted in a position close to or directly over the rear drive wheels.

This installation allows a simple Vee belt operating in the horizontal plane to transfer engine power from the engine pulley to a drive pulley keyed to the input shaft of the transaxle.

Figure 1:
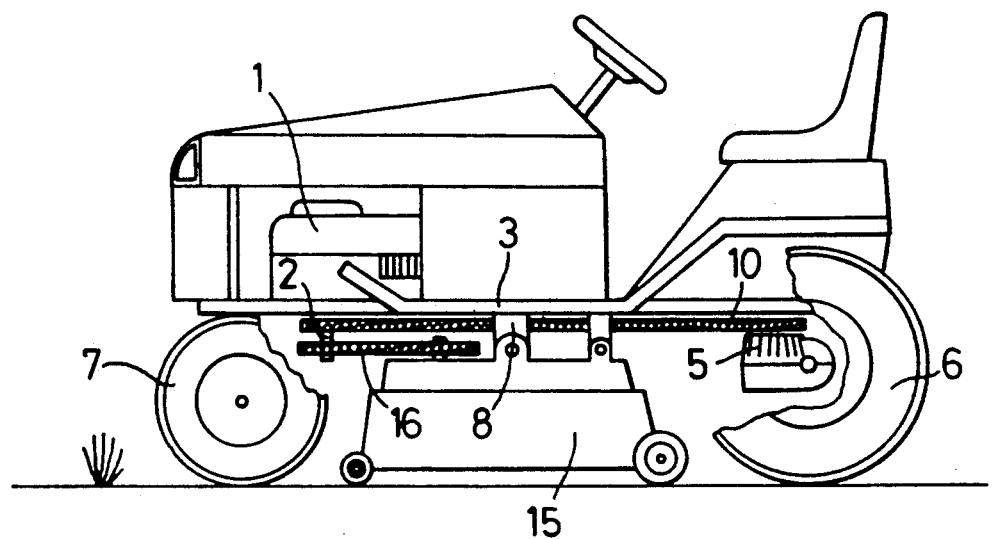
FIG. 1 is a side view of a typical grass cutting lawn or garden tractor vehicle.
Figure 2:
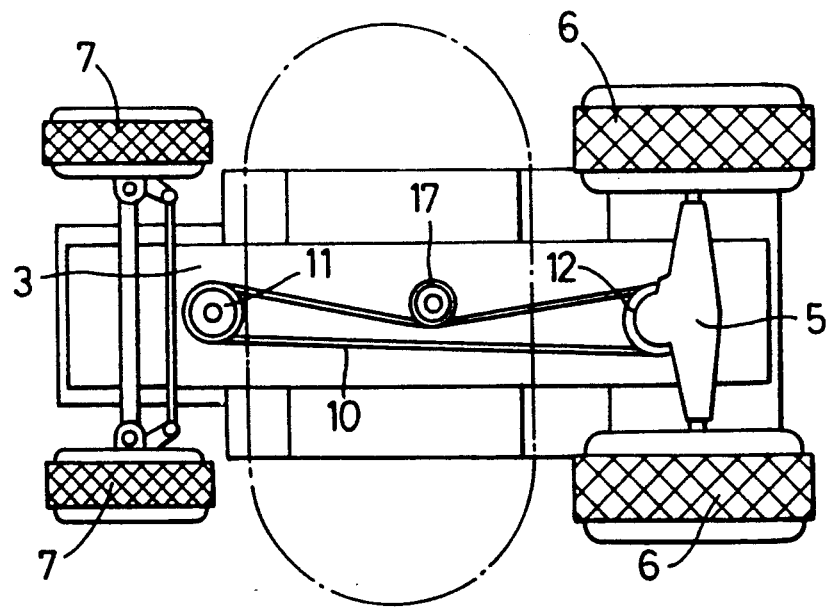
FIG. 2 is an underneath view of the vehicle in FIG. 1.

The tractor vehicle illustrated in FIGS. 1 and 2 comprises a vertically installed internal combustion engine 1 with the crank shaft 2 pointing down to the ground. The engine 1 is shown mounted at the front end of the tractor chassis 3, and the transaxle 5 containing an internally disposed hydrostatic transmission is mounted towards the rear of the tractor chassis 3 and engaged to the rear drive wheels 6. A Vee belt 10 operating in the horizontal plane connects the engine pulley 11 with the input drive pulley 12 of the transaxle 5, with a simple jockey pulley 17 acting as tensioning means for the Vee belt as shown in FIG. 2. On occasion, a clutch pedal connected via linkages to the jockey pulley 17 is required to release the tension of the Vee belt before the engine is started.

In FIG. 1, a grass mower deck 15 is shown located beneath the vehicle chassis 3 in a position between the rear two drive wheels 6 and the front two steering wheels 7 of the tractor. The mower deck 15 is attached to the tractor chassis 3 by way of height-adjusting supports 8 and is driven from the engine 1 by means of a short Vee belt 16.

Figure 3:
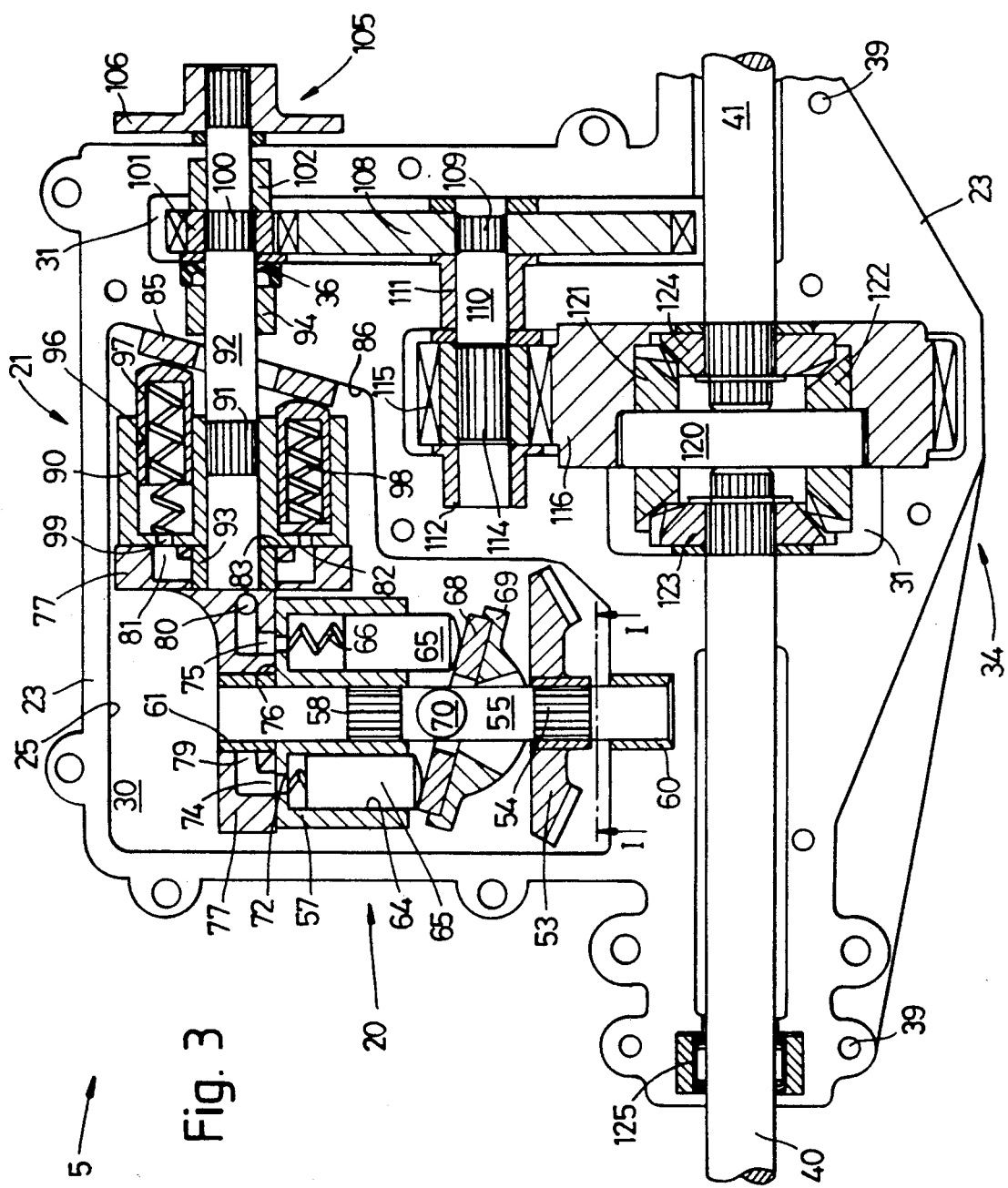
FIG. 3 is a plan view of the variable speed transaxle with the upper housing element removed to show a hydrostatic transmission of the axial piston type.
Figure 4:
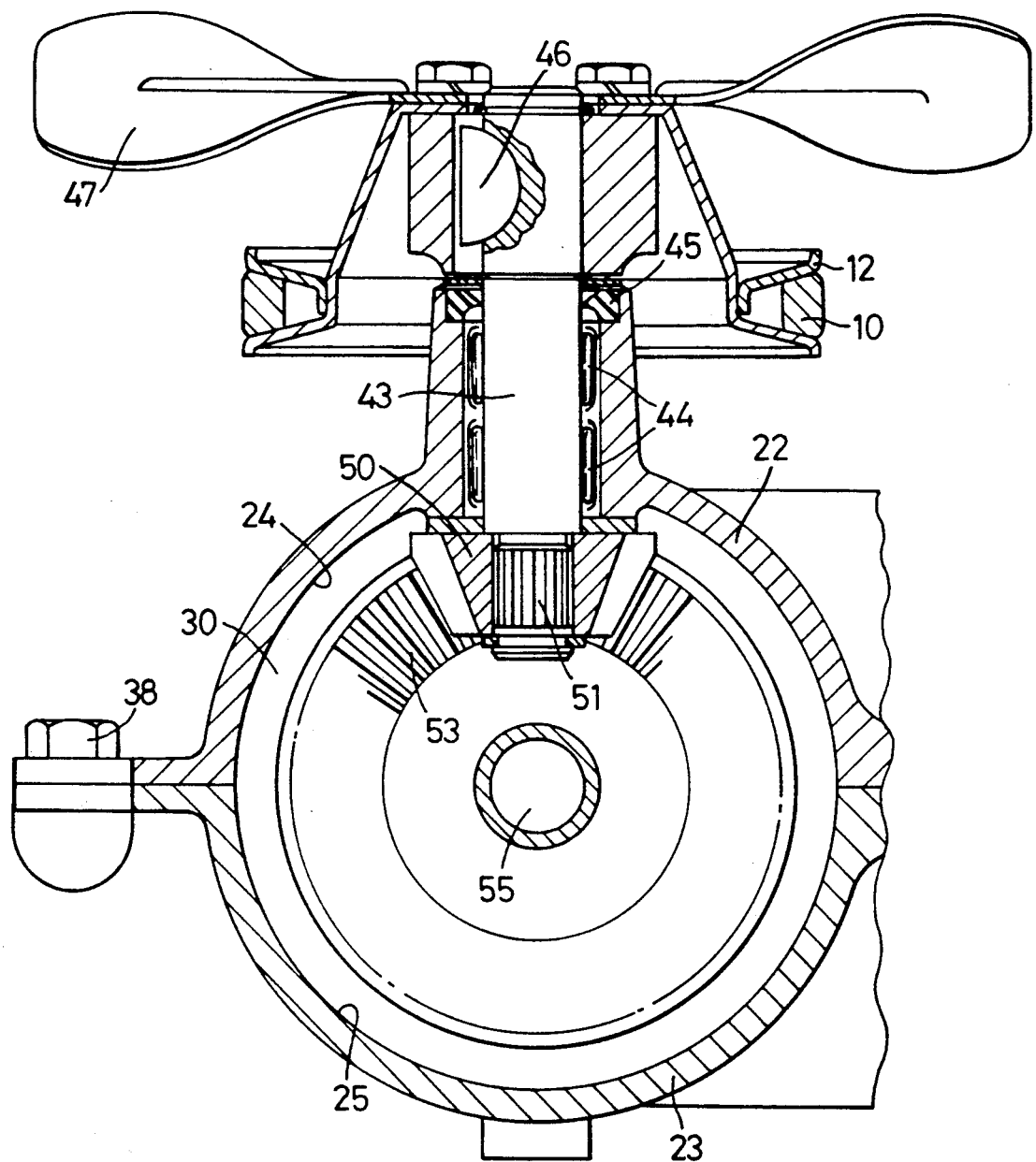
FIG. 4 is a part section view along I—I of FIG. 3 disclosing the drive installation comprising input shaft and bevel gearing.

The hydrostatic unit illustrated in FIGS. 3 and 4 comprises a hydraulic pump 20 fluidly coupled to a hydraulic motor 21. The transaxle 5 comprises two housing elements 22, 23, each of which includes a number of pockets such as those pockets 24, 25 shown in FIG. 4. When the two housing elements 22, 23 are attached together, pockets combine to form internal chambers, one chamber 30 contains the hydraulic pump 20 and hydraulic motor 21 of the hydrostatic unit, and chamber 31 contains the speed reducing gearing 33 and mechanical differential 34.

Chambers 30, 31 need to be sealed against the loss of lubricant, and this is achieved by applying sealing means such as liquid gasket between the abutting surfaces of the two housing elements 22, 23. Shaft seal 36 is also provided to segregate hydraulic chamber 30 from chamber 31. However, for some low-cost applications, shaft seal 36 may be omitted allowing all chambers to be flooded in a common oil bath.

The two housing elements 22, 23 are attached together by a plurality of screws 38 which are inserted through holes 39. When screws 38 are tightened down, housing elements 22, 23 form a stiff housing structure which is attached to the chassis 3 of the vehicle.

In these embodiments, housing elements 22, 23 are shown separable at a parting plane along the longitudinal axes of the half shafts 40, 41 of the transaxle 5.

The housing elements 22, 23 are preferrably formed to include an integral fluid expansion chamber (not shown) linked to chamber 30. The addition of an expandable bag element within expansion chamber as described in U.S. Pat. No. 4,987,796, allows the contraction and expansion of the working hydraulic fluid within chamber 30 due to temperature fluctuation.

The transaxle 5 is provided with a vertical input drive shaft 43 and supported on bearings 44 in housing element 22. A fluid seal 45 is provided to prevent the escape of fluid from hydraulic chamber 30. Input drive shaft 43 protrudes through the upper housing element 22 and is keyed 46 to the pulley 12 on which vee belt 10 operates in transmitting power from the prime mover 1 to the transaxle 5. A cooling fan 47 is attached to pulley 12 and acts as a simple cooling means for the hydrostatic unit.

At the other end of the input drive shaft 43, a bevel pinion 50 is engaged at 51 for rotation with shaft 43. Gear 50 is arranged to mesh with a further bevel gear 53 which is attached at 54 to shaft 55. The rotary cylinder barrel 57 of hydraulic pump 20 is supported and driven by way of splines 58 on shaft 55, where bearings 60, 61 disposed at each end of shaft 55 act to support shaft 55 in housing elements 22, 23.

The use of such bevel gearing 50, 53 allows the axis of rotation to be turned through ninety degrees so that the rotating axes of the hydrostatic unit are along the same plane as the half shafts 40, 41 of the transaxle 5.

Hydraulic pump 20 and motor 21 of the hydrostatic unit are mounted perpendicular to one another and are of generally similar construction with minor points of difference as described below.

The cylinder barrel 57 of hydraulic pump 20 is formed with a number of axial cylinders 64 into which are disposed pistons 65. A spring 66 behind each piston 65 acts to hold pistons 65 against a thrust ring 68 which is located to cradle 69.

Cradle 69 is supported in two trunnion shafts at each side, (only one trunnion shaft 70 being shown in FIG. 3.) that allow cradle 69 to tilt within limits, usually about fifteen degrees either side from center. Shaft 70 is connected to an external linkage outside the transaxle 5 to a control lever through which the vehicle operator controls the speed and direction of the vehicle. Movement of the control lever causes shaft 70 to turn, with the result that the inclination of cradle 69 (and thrust ring 68) is adjusted relative to the axis of the pistons 65.

Each cylinder 64 is provided with a port 72 through which fluid can pass into and out of the cylinder 64, and each port 72 is arranged to fluidly connect in sequence with arcuate ports 74, 75 formed on one end face 76 of the valve fluid coupling member 77.

Valve member 77 is a one-piece casting which is rigidly secured to either or preferably both housing elements 22, 23 of the transaxle 5. Within valve member 77 are two internal passages 79, 80 that link arcuate ports 74, 75 of the hydraulic pump 20 to arcuate ports 81, 82 for the hydraulic motor 21 that are formed on end face 83 of the valve member 77.

The construction of the hydraulic motor 21 differs from the hydraulic pump 20 in one main respect in that the thrust ring 85 is not adjustable and is in fact mounted at a fixed angle to the wall 86 provided by the housing elements 22, 23.

The cylinder barrel 90 of hydraulic motor 21 is engaged at 91 to shaft 92 which is supported by bearings 93 and 94 at each end. Cylinder barrel 90 has a number of cylinders 96 each containing a piston 97 which is loaded against the thrust ring 85 by means of spring 98. Each cylinder 96 is provided with a port 99 through which fluid can pass into and out of the cylinder 96, and each port 99 is arranged to fluidly connect in sequence with arcuate ports 81, 82 formed on end face 83 of the valve member 77.

Each arcuate port 81, 82 being linked through respective internal fluid passages 79, 80 in valve member 77 to related arcuate ports 74, 75 serving hydraulic pump 20, and where each internal fluid passage 79, 80 is arranged to connect with both a check valve and preferably a fluid dump valve that are included within the body of valve member 77 that act to release or draw fluid between oil chamber 30 and passages 79, 80 in a manner known to those skilled in the art.

Shaft 92 is extended at one end to pass into chamber 31 where it is engaged at 100 to gear 101 with bearing 102 providing further support, shaft 92 being further extended so as to protrude out from the transaxle 5 housing to connect with a brake assembly 105. Brake assembly 105 being of conventional type employing a disc 106 which is engaged to shaft 92 and when held by calipers (not shown), prevents shaft 92 from rotating.

Gear 101 meshes with larger gear 108 which is engaged by splines 109 to shaft 110 supported by bearings 111, 112. Shaft 110 is engaged by splines 114 to final drive pinion gear 115 which is in mesh with ring gear 116 of the differential 34.

The differential 34 has a central shaft 120 on which bevel gears 121, 122 are mounted and which mesh with bevel gears 123, 124 that are nonrotatably connected to respective ones of half shafts 40, 41 as described in more detail in U.S. Pat. No. 4,480,501.

Bevel gears 121, 122, 123, 124 of the differential 34 acts to transmit the drive from the ring gear 116 to the half shafts 40, 41 and the rear drive wheels 6 of the vehicle as known to those skilled in the art. The inclusion of a differential 34 is important as it allows normal differentation between left and right drive wheels 6 of the vehicle and helps prevent lawn damage especially when tight turns are undertaken.

Preferably, half shafts 40, 41 are supported by bearings 125 in the housing elements 21, 22, although for low-duty applications, half shafts 40, 41 can be supported directly on the material of the housing elements.

An alternative embodiment as shown in FIG. 5 departs from the transaxle just described in that the input bevel gear set are here disposed outside fluid chamber 30 of the hydrostatic unit. The advantage being that during operation, no metal contamination from the bevel gears is introduced to fluid chamber 30 containing the hydrostatic unit, and as a result, the useful life of the hydrostatic transmission may be increased.

Therefore chamber 130 is provided within housing elements 21, 22 into which the bevel pinion 50 and gear 53 are located. Seal 133 on shaft 55 and located in housing wall 134 prevents fluid from within chamber 30 from escaping into chamber 130.

Chamber 130 may be formed to connect with chamber 31 containing speed reducing gearings 33 and differential 34.

The complete transaxle package as shown in this embodiment is extremely compact compared to those known to date as the relative position of the input drive shaft to the differential and connecting half shafts of the transaxle is in close proximity.

As a result, notable and worthwhile savings in the weight of material forming the housing envelope is achieved.

As both transaxles operate in same manner, only a description of operation of the first embodiment will be given.

By appropriate positioning of control shaft 70 by the vehicle operator turning it, say clockwise, cradle 69 is tilted with respect to the axis of the pistons 65. As a result, the speed ratio of the hydrostatic unit is adjusted. For instance, for forward motion of the vehicle, rotation of the input shaft 43 drives through bevel pinion 50 and gear 53 the drive shaft 55 of the hydraulic pump 20. Rotation of the pump cylinder barrel 57 and consequent axial reciprocation movement of the pistons 65, causes pressurized fluid to flow out from the cylinder bore 64, through port 72 into arcuate port 74 and along passage 79. The action of the incoming fluid through arcuate port 81 and into port 99 in the cylinder barrel 90 of hydraulic motor 21 causes pistons 97 to stroke as thrust ring 85 is set at fixed inclination with respect to piston 97 axis.

The pressure force acting behind the piston 97 onto the inclined thrust ring 85, produces a side force on the cylinder wall 96 of cylinder barrel 90 which causes the cylinder barrel 90 to rotate.

As cylinder barrel 90 is engaged by splines 91 to shaft 92, mechanical power is transfered from the shaft 92 mounted pinion gear 101 to meshing gear 108.

As gear 108 and final drive pinion 115 are both splined to a common shaft 110, power is transfered through gear 115 to ring gear 116 of the differential 34. Internal bevel gears 121, 122, 123, 124 of the differential 34 operate in transmitting the power directly to the half shafts 40, 41 and thereby the rear drive wheels 6 of the vehicle.

To reverse direction of the vehicle, the operator turns control shaft 70 anti-clockwise so that cradle 69 is tilted the other way. In this case, rotation of the pump cylinder barrel 57 and consequent axial reciprocation movement of the pistons 65, causes fluid to flow out from the cylinder bore 64, through port 72 into arcuate port 75 and along passage 80. The action of the incoming fluid through arcuate port 82 and into port 99 in the cylinder barrel 90 of hydraulic motor 21 causes pistons 97 to stoke against thrust ring 85. However, because in this case, arcuate port 82 is pressurized, the pressure force acting behind piston 97 on thrust ring 85 causes the cylinder barrel 90 to rotate in opposite direction to the above described example when the other arcuate port 81 was pressurized.

Speed reducing gearing 33 transmits power from the cylinder barrel 90 rotating in reverse direction, to the half shafts 40, 41 with the result that the vehicle moves backwards.

Finally, when the operator turns control shaft 70 to it central position, cradle 69 is then aligned perpendicular to the piston 65 axis, with the result that there is reciprocation of the pistons 65 and the vehicle is set at rest. The operator may then engage the calipers onto disc 106 of brake assembly 105 and the vehicle is parked.

It is to be understood that while we have illustrated and described one form of our invention, it is not to be limited to the specific form or arrangement of parts herein described and shown except insofar as such limitations are included in the claims.

What is claimed is:

1. An axle assembly comprising:
 a housing including two main housing elements connected together along a parting plane and defining an internal chamber;
 a hydrostatic transmission encapsulated in said chamber and including a hydrostatic pump fluidly coupled to a hydrostatic motor by means of a coupling member non-rotatably supported in said housing;
 a primary shaft rotatably mounted in one said housing element and extending into said chamber for engagement with a first bevel gear;
 a secondary shaft drivingly connecting a second bevel gear to said hydrostatic pump, said first bevel gear drivingly engaged to said second bevel gear;
 axle shaft means rotatably supported in said housing, and having its axis substantially coincident with said parting plane; and
 differential gearing means within said chamber drivingly connected between said hydrostatic motor and said axle shaft means;
 wherein said hydrostatic pump and said hydrostatic motor are mounted in perpendicular relationship to one another via said coupling member such that
 the rotational axes of said hydrostatic pump and said hydrostatic motor are parallel to said parting plane and perpendicular to said primary shaft.

2. An axle assembly of claim 1 wherein said coupling member and said housing each support a respective end of said secondary shaft.

3. The axle assembly of claim 1 wherein the rotational axes of all three of said hydrostatic pump, said hydrostatic motor and said axle shaft means are substantially coincident with said parting plane.

4. An axle assembling comprising:
 a housing including two main housing elements connected together along a parting plane and defining at least two internal chambers;
 a hydrostatic transmission encapsulated in one of said chambers and including a hydrostatic pump fluidly coupled to a hydrostatic motor in by means of a coupling member non-rotatably supported in said housing;

a primary shaft rotatably mounted in one of said housing element and extending into one said chamber for engagement with a first bevel gear;

a secondary shaft drivingly connecting a second bevel gear to said hydrostatic pump, said first bevel gear drivingly engaged to said second bevel gear;

axle shaft means rotatably supported in said housing, and having its axis substantially coincident with said parting plane; and differential gearing means within one of said chambers drivingly connected between said hydrostatic motor and said axle shaft means, said differential gears and said first and second bevel gears being disposed in any said chamber other than in said chamber containing said hydrostatic transmission;

wherein said hydrostatic pump and said hydrostatic motor are mounted in perpendicular relationship to one another via said coupling member such that the rotational axes of said hydrostatic pump and said hydrostatic motor are parallel to said parting plane and perpendicular to said primary shaft.

5. An axle assembly of claim 4 wherein said housing includes a partition wall separating said chambers.

6. An axle assembly of claim 5 wherein said partition wall supports sealing means, said sealing means positioned to surround at least one said chamber.

7. An axle assembly of claim 4 wherein said coupling member and said housing each support a respective end of said secondary shaft.

8. The axle assembly of claim 4 wherein the rotational axes of all three of said hydrostatic pump, said hydrostatic motor and said axle shaft means are substantially coincident with said parting plane.

9. An axle assembly comprising:

a housing including two main housing elements connected together along a parting plane and defining first and second internal chambers;

a hydrostatic transmission encapsulated in said first chamber and including a hydrostatic pump fluidly coupled to a hydrostatic motor by means of a coupling member non-rotatably supported in said housing;

a primary shaft rotatably mounted in one said housing element and extending into said first chamber for engagement with a first bevel gear;

a secondary shaft drivingly connecting a second bevel gear to said hydrostatic pump, said first bevel gear drivingly engaged to said second bevel gear;

axle shaft means rotatably supported in said housing, and having its axis substantially coincident with said parting plane; and differential gearing means within said second chamber drivingly connected between said hydrostatic motor and said axle shaft means;

wherein said hydrostatic pump and said hydrostatic motor are mounted in perpendicular relationship to one another via said coupling member such that the rotational axes of said hydrostatic pump and said hydrostatic motor are parallel to said parting plane and perpendicular to said primary shaft.

10. An axle assembly of claim 9 wherein said housing includes a partition wall separating said first and second chambers.

11. An axle assembly of claim 10 wherein said partition wall supports sealing means, said sealing means positioned to surround said first chamber to prevent the escape of hydraulic fluid contained within said first chamber.

12. An axle assembly of claim 9 wherein said coupling member and said housing each support a respective end of said secondary shaft.

13. The axle assembly of claim 9 wherein the rotational axes of all three of said hydrostatic pump, said hydrostatic motor and said axle shaft means are substantially coincident with said parting plane.

14. An axle assembly comprising:

a housing including two main housing elements connected together along a parting plane and defining first and second internal chambers;

a hydrostatic transmission encapsulated in said first chamber and including a hydrostatic pump fluidly coupled to a hydrostatic motor by means of a coupling member non-rotatably supported in said housing;

a primary shaft rotatably mounted in one said housing element and extending into said second chamber for engagement with a first bevel gear;

a secondary shaft drivingly connecting a second bevel gear to said hydrostatic pump, said first bevel gear drivingly engaged to said second bevel gear;

axle shaft means rotatably supported in said housing, and having its axis substantially coincident with said parting plane; and differential gearing means within said second chamber drivingly connected between said hydrostatic motor and said axle shaft means;

wherein said hydrostatic pump and said hydrostatic motor are mounted in perpendicular relationship to one another via said coupling member such that the rotational axes of said hydrostatic pump and sid hydrostatic motor are parallel to said parting plane and perpendicular to said primary shaft.

15. An axle assembly of claim 14 wherein said housing includes a partition wall separating said first and second chambers.

16. An axle assembly of claim 15 wherein said partition wall supports sealing means, said sealing means positioned to surround said first chamber to prevent the escape of hydraulic fluid contained within said first chamber.

17. An axle assembly of claim 14 wherein said coupling member and said housing each support a respective end of said secondary shaft.

18. The axle assembly of claim 14 wherein the rotational axes of all three of said hydrostatic pump, said hydrostatic motor and said axle shaft means are substantially coincident with said parting plane.

* * * * *